US005515648A

United States Patent [19]
Sparkes

[11] Patent Number: 5,515,648
[45] Date of Patent: May 14, 1996

[54] PLANT CULTIVATION METHOD AND APPARATUS

[75] Inventor: Alec G. Sparkes, Ferring, England

[73] Assignee: Perifleur Products Ltd., Great Britain

[21] Appl. No.: 244,992

[22] PCT Filed: Dec. 18, 1992

[86] PCT No.: PCT/GB92/02356

§ 371 Date: Sep. 29, 1994

§ 102(e) Date: Sep. 29, 1994

[87] PCT Pub. No.: WO93/12644

PCT Pub. Date: Jul. 8, 1993

[30] Foreign Application Priority Data

Dec. 21, 1991 [GB] United Kingdom ............... 9127216

[51] Int. Cl.$^6$ .................................................. A01G 31/02
[52] U.S. Cl. ................................ 47/65; 47/DIG. 6
[58] Field of Search ..................... 47/65 D, DIG. 6

[56] References Cited

U.S. PATENT DOCUMENTS 3,343,300  9/1967  Englert .
3,529,379  9/1970  Ware .
3,882,634  5/1975  Dedolph .
3,909,978  10/1975  Fleming .

FOREIGN PATENT DOCUMENTS 810147    3/1981   U.S.S.R. ............... 47/DIG. 6
914004    3/1982   U.S.S.R. ............... 47/DIG. 6
1034681   8/1983   U.S.S.R. ............... 47/DIG. 6
1519595   11/1989  U.S.S.R. ............... 47/65 D

OTHER PUBLICATIONS

The Washington Post Science/Engineering p. A3 Oct. 24, 1994.

Primary Examiner—Henry E. Raduazo
Attorney, Agent, or Firm—Lucas & Just

[57] ABSTRACT

The present invention relates to the propagation and growing of plants, and particularly concerns an apparatus for growing large numbers of plants in a small area, with optimized use of available and artificial light, and to reduce the effect of plants competing for light.

9 Claims, 5 Drawing Sheets

PLANT CULTIVATION METHOD AND APPARATUS

BACKGROUND OF THE INVENTION

In conventional glasshouse methods, cuttings are rooted in a substrate by holding them in a horizontal plane beneath artificial and/or natural light. As will as requiring a relatively large ground area for each plant, the use of overhead light sources leads to an uneven intensity in the light levels received by individual plants in the crop, and thus growth rates are non-uniform. Working or harvesting the crop from ground level is also labour-intensive and slow due to the inconvenient working attitude.

In U.S. Pat. No. 3,529,379, there is described an apparatus wherein potted plants are placed on trays which are linked to a conveyor system, the plants being maintained in a vertical orientation and passing vertically by a plurality of light sources arranged in a vertical planar array. The plants passing the light sources receive the majority of their incident radiation from the side, rather than in a vertically downward direction relative to the plants.

In U.S. Pat. No. 3,882,634, an apparatus intended to increase plant yield by effectively removing gravitational influences on such growth is described. The apparatus comprises a plurality of plant supports wherein plants are held, the plant supports and plants being rotated about horizontal axes which are substantially perpendicular to the plant stems.

It is an objective of the present invention to provide an apparatus and system for the cultivation of plants wherein a large number of plants can be grown in a small area, with substantially uniform illumination of all the plants in the crop, and with facilitated ergonomic access to the plants for working the crop.

According to a first aspect of the present invention, an apparatus for the cultivation of plants comprises a pair of substantially rigid rotatable end frames mounted for rotation about a common horizontal axis, a number of elongate plant-supporting elements mounted at their respective ends to the respective end frames and arranged with their longitudinal axes generally parallel, the plant-supporting elements being rotatable about their longitudinal axes relative to the end frames, and wherein the plant-supporting elements are provided with radially extending plant receptacles arranged regularly on their surfaces, characterised in that an elongate horizontal linear source of radiation beneficial to plants, emitting radiation substantially uniformly in all radial directions, is positioned along the axis of rotation of the end frames to expose the surfaces of the plant-supporting elements to a uniform amount of incident radiation from all directions relative to the plant stem direction. The plant-supporting elements are rotatable about their respective individual axes, and are also rotatable about the axis of the radiation source in order to achieve uniform exposure to ambient light. The plant-supporting elements are preferably hollow cylindrical components which support the plants in sockets or grooves for growth in directions substantially perpendicular to the surface of the cylinder. Nutrients may be provided to the interior of the cylinder either as a mist, a spray of droplets, or as a liquid stream.

Preferably, the plant-supporting elements are adjustable in their spacing from the radiation source so as to provide for variation of the intensity of radiation incident upon the plants.

While the array of plant-supporting elements rotates about the central radiation source, it is foreseen that auxiliary radiation sources similar to and parallel to the central radiation source may be provided, either at locations fixed in space or at locations fixed relative to the array of plant-supporting elements. By radiation is meant not only visible light but also infra-red and ultraviolet light, the radiation being monochromatic or composed of multiple frequencies.

When the individual plant-supporting elements are rotated about their axes as well as about the central axis, in a "planetary" type motion, it will be understood that the two speeds of rotation will be arranged so that all plants are evenly exposed to the central illumination source. The speeds of rotation of the individual cylinders, and of the array as a whole may be adjusted to optimize the effect on the growth of the plants—slower rotations to promote lateral growth and branching, and faster rotations tending to maintain apical dominance.

According to a second aspect of the invention, a method of cultivating plants comprises the steps of providing an array of cylindrical plant-supporting elements rotatable about a horizontal axis and illuminated by a linear source of illuminating radiation extending along the axis and emitting radiation radially relative thereto, planting a plurality of plants in plant-receiving sockets and fixing said plant-receiving sockets to said plant-supporting elements, and rotating the array of plants and plant-supporting elements about the linear radiation source to effect a rotation of the plants about horizontal axes, for a predetermined growth period of the plants.

In advantageous developments of the method, cuttings for propagating plants are taken and are placed in plant-receiving means arranged along an elongate planting band and the band is subsequently wound helically about a cylindrical plant-supporting element, with the spacing of the plant receiving means of the band corresponding to the spacing between the sockets of the plant-supporting element or with the band following a helical groove on the cylinder. Two or more bands may be wound about a cylinder, to allow 'thinning' of the plants by removing one or more bands from a multiple helix array of bands.

An embodiment of the invention will now be described in detail with reference to the accompanying drawings, in which.

Figure 1:
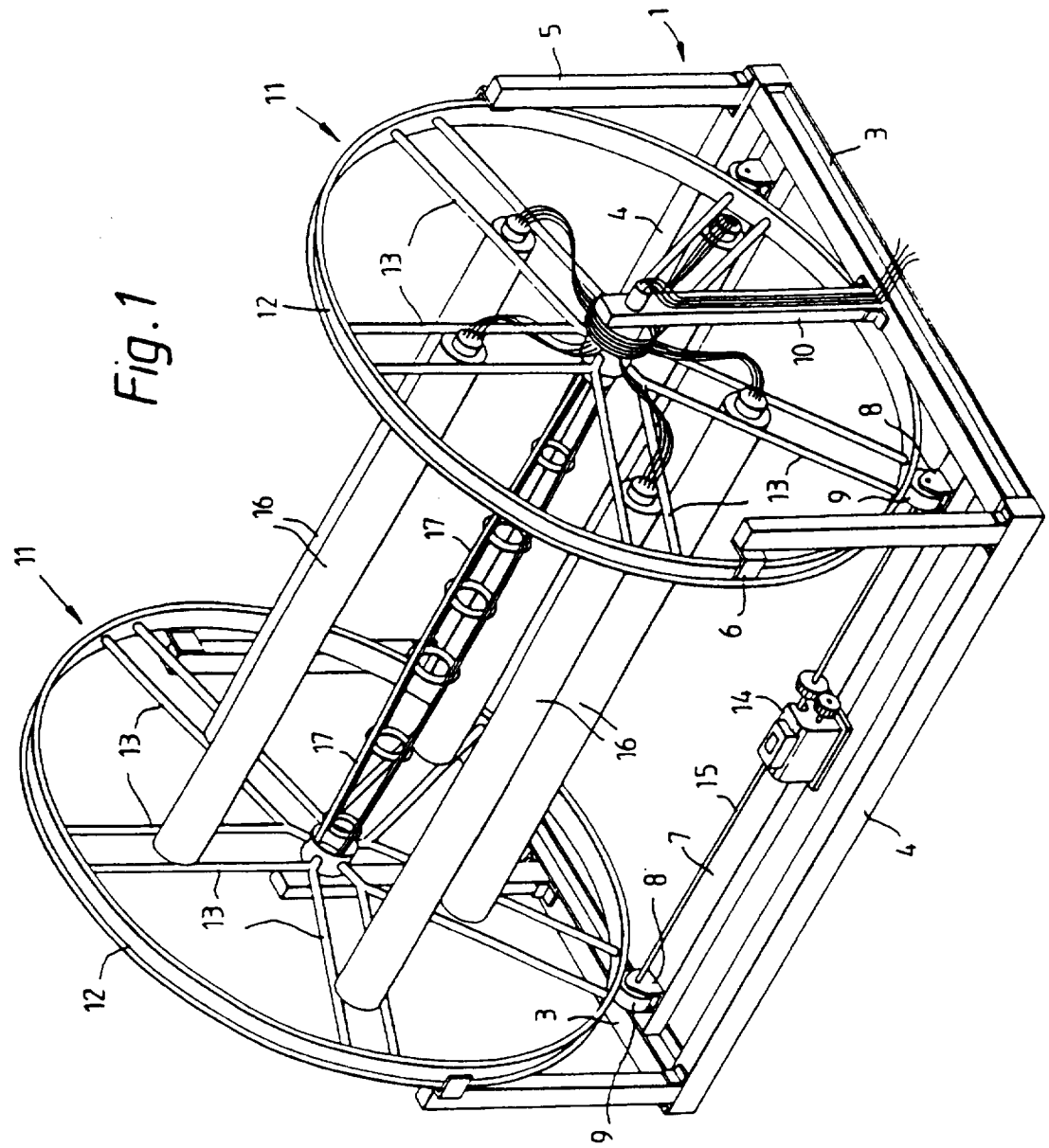
FIG. 1 is a schematic perspective view of a plant propagating apparatus.

Referring now to the Figures, there is shown a plant propagation apparatus 1 comprising a substantially rectangular base frame composed of two end members 3 and two side members 4. The base may be stationary or movable. Extending upwardly from each corner of the base frame is an upright 5, provided at its upper end with a guide bracket 6, preferably equipped with guide rollers (not shown).

Extending longitudinally between the end members 3 are two support beams 7, adjacent whose ends are mounted brackets 8 in which support rollers 9 are mounted to rotate about axes parallel to the longitudinal direction of the frame.

From the centre of each end member 3, a central pillar 10 extends upwardly. The upper end of the pillar supports the fixed central core of the rotating part of the apparatus. A slip ring and swivel joints allow for the supply of power and nutrients to the rotating elements.

The rotating part of the apparatus comprises a pair of end frames 11 each having a circular rim 12 and a number of radial spokes 13. In the embodiment shown, the radial spokes are arranged in five sets of parallel pairs. The rims 12 of the end frames 11 rest on the support rollers 9, and slidingly engage the guide brackets 6 situated at the upper ends of uprights 5.

The end frames 11 are arranged coaxially, and can be caused to rotate in either direction about their axis by a drive motor 14 connected to the support rollers 9 by means of drive shafts 15. While it is possible to drive both rollers 9 which support each end frame 11, it is possible to provide drive only to one of the rollers 9 associated with each end frame 11. The rollers 9 are driven so that the end frames 11 rotate at the same speed and in the same direction.

Extending between corresponding pairs of spokes 13 of the two end frames 11 are a number of plant supporting elements 16. In the embodiment shown the plant supporting elements are circular cylinders, but polygonal cylinders are foreseen. Likewise the plant supporting elements may be conical, with their axes arranged so that generators of the cone adjacent the radiation source are parallel thereto. In the FIG., five cylinders 16 are visible. The cylinders are mounted to the pairs of spokes 13 by adjustable fixing means (not shown) which allow the cylinders 16 to be positioned at a selected radial spacing from the axis of the rotating apparatus. The cylinder diameter may be selected to suit the growth characteristics of particular plant species.

The cylinders 16 are also capable of rotation relative to the end frame 11, this rotation being either in the same sense or in the opposite sense to that of the rotation of the end frames. Preferably, each cylinder 16 is driven in rotation by an independently controllable motor M so that the rotational speed of each of the cylinders 16 may be individually controlled. Alternatively a common drive may be provided using a gear train, chain or cable.

Extending along the axis of the rotating part of the apparatus is a substantially linear radiation source 17 which emits radiation evenly in all radial directions. The preferred construction of light source 17 is a plurality of individual lamps spaced along the central axis of the apparatus. The spectrum of the radiation emitted may be chosen so as to induce a particular growth response in the species of plant to be cultivated, and the spectrum may be variable to suit different stages in the plant's growth cycle. Monochromatic light, of a frequency chosen to suit the particular type of plant being cultivated, is advantageous as it provides an energy-efficient illumination of the plants. The illumination may be continuous or intermittent.

Figure 2:
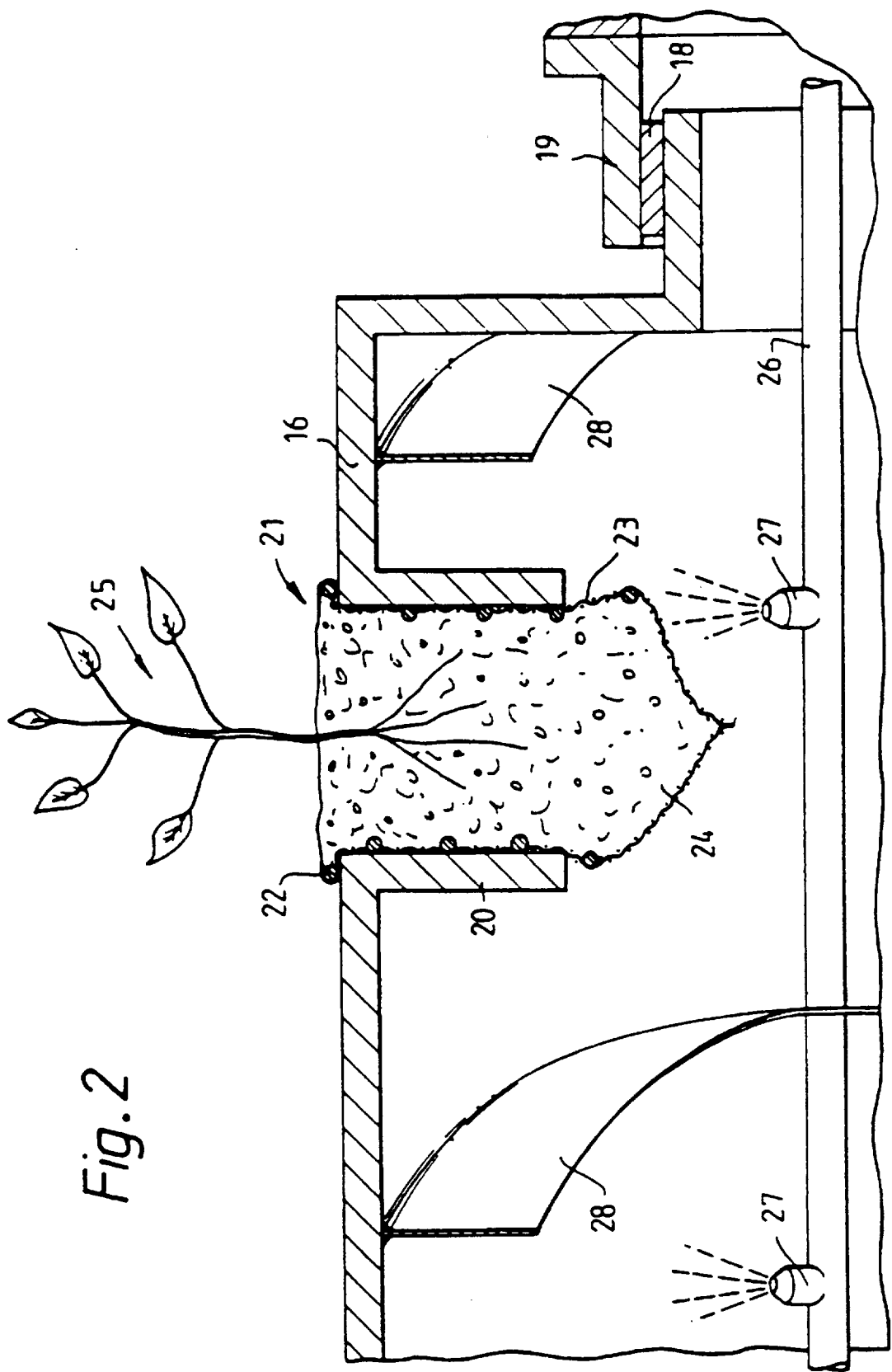
FIG. 2 is a partial sectional view of a cylinder used in the apparatus of FIG. 1.
Figure 3:
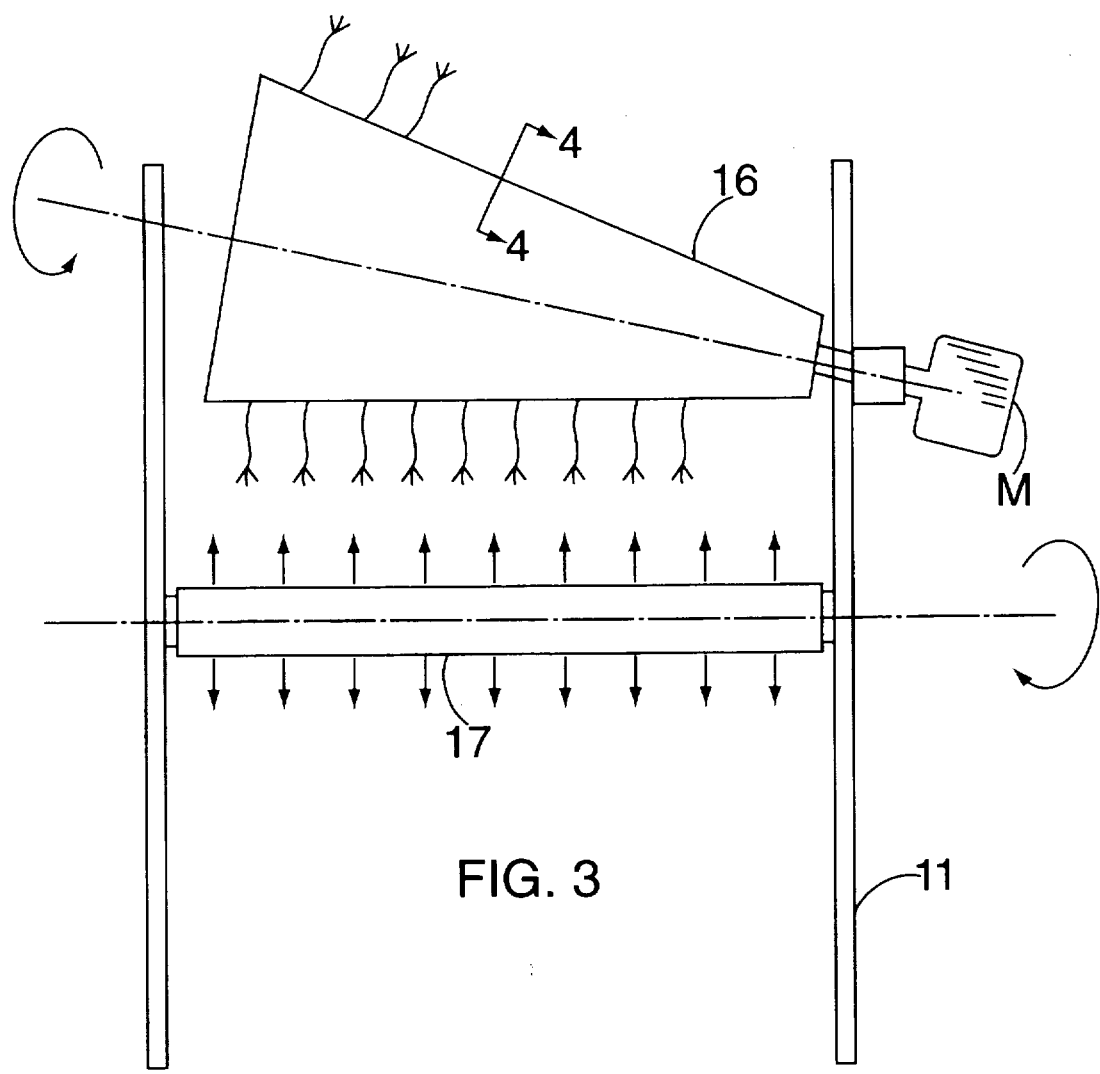
FIG. 3 is a schematic side view of the plant propogation apparatus of FIG.1.
Figure 4:
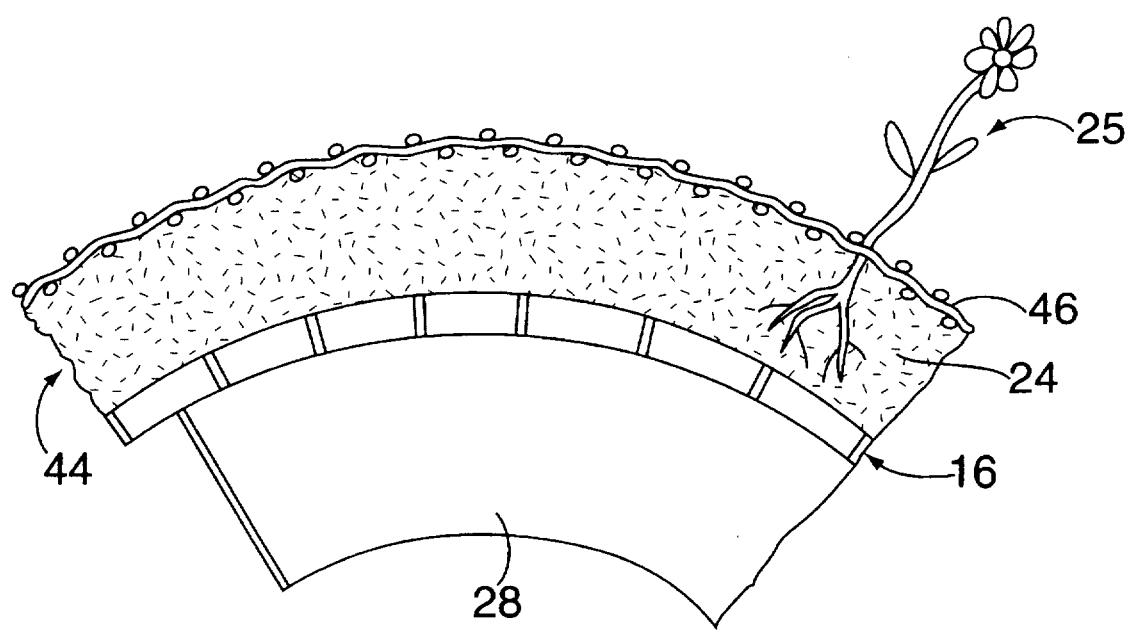
FIG. 4 is a sectional view taken along the line IV to IV of FIG. 3.
Figure 5:
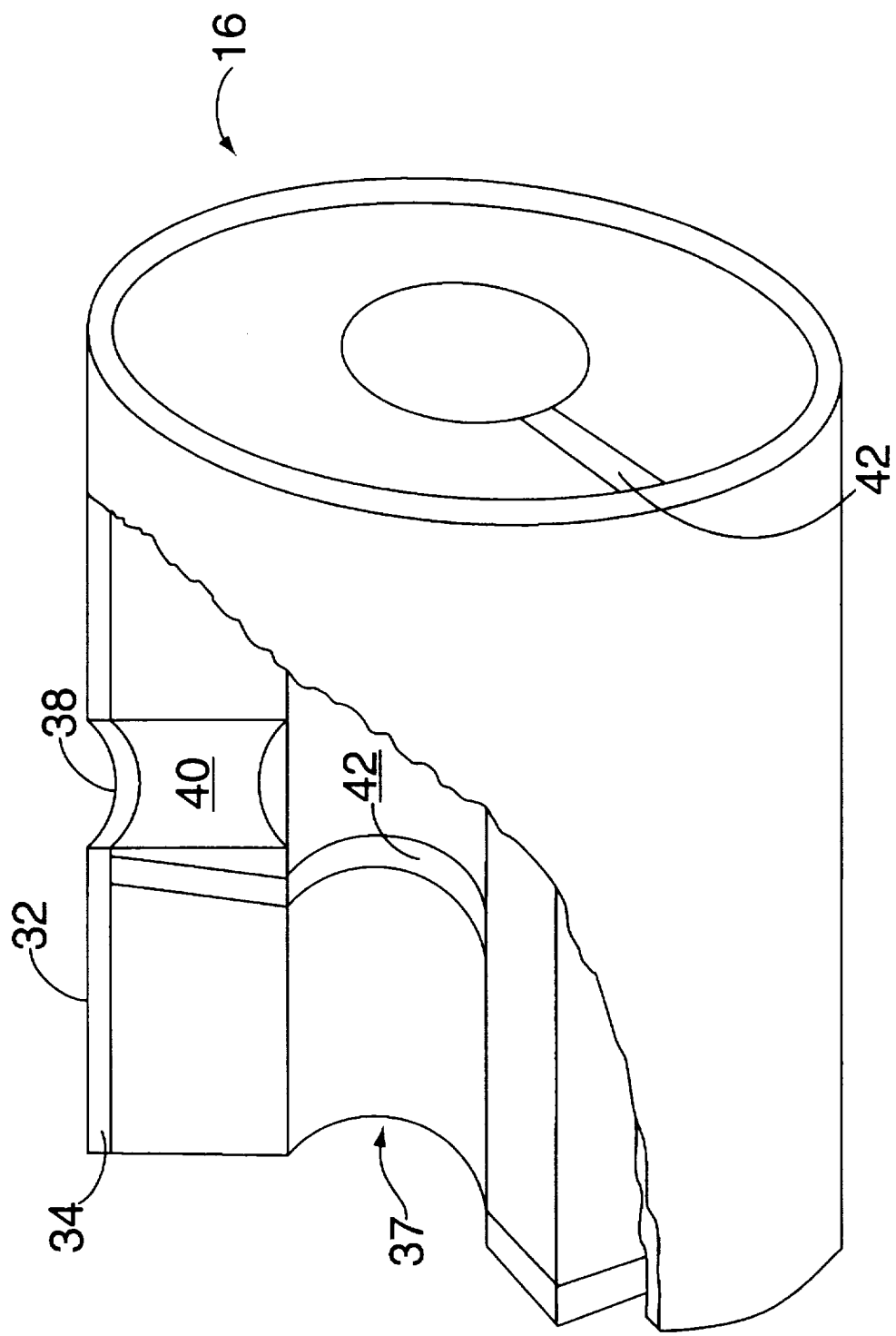
FIG. 5 is a perspective view of a part of a cylindrical plant support element of the plant propogation apparatus of FIG. 1.

Referring to FIG. 2, each of the cylinders 16 is supported at its ends in bearings 18 which are themselves supported in brackets 19 which are fixable to the spokes 13 of the end frames 11.

In the embodiment shown, the cylinders 16 are formed as hollow bodies, and are provided at intervals over their surfaces with inwardly extending tubular sockets 20. The sockets 20 extend inwardly of the cylinders by a distance less than the radius of the cylinders, so as to leave a central space extending along the axial region of the cylinder 16.

Plants such as seedlings or cuttings are received in the sockets 20, using plant holders 21. In the embodiment shown, each plant holder 21 comprises a helical spring 22 whose ends have a diameter larger than the diameter of the socket 20, and whose central portion may be of a diameter substantially equal to the diameter of the socket 20. The helical spring 22 is received within a porous flexible membrane or net 23 to form a cylindrical container. A growing medium 24 fills the container formed by the spring 22 and membrane 23, and the growth medium 24 supports the plant 25 which may be a cutting rooted in the growth medium 24, or may be a seedling which has been planted into the container formed by spring 22 and membrane 23.

Each cylinder 16 will house a plurality of sockets 20 extending in radial directions, and each socket 20 may receive a plant holder 21 for the growth of a plant 25. The resilience of the springs 22 allows the plant holders 21 to be pushed into the sockets, where they are retained by the enlarged ends of the spring 22 engaging the ends of the socket 20. The plant holders and plants are, however, removable from the sockets 20 by pulling.

Within the cylinder 16, axially extending conduits are provided to supply water and nutrients to the growing plants. In the embodiment shown, a nutrient supply duct 26 is provided at intervals with nozzles 27 which provide a nutrient spray to the interior of the cylinder 16. The nutrient spray may form a mist within the cylinder or may be in the form of larger droplets directed onto the membranes 23 at the radially inner ends of the plant holders 21. As an alternative, individually controlled spigots attached to a common supply duct may be provided to give a controlled flow of liquids to each plant holder. To remove excess water and nutrients from the interior of the cylinder 16, a helical fence 28 is fixed to the interior of the cylinder 16, so that the rotation of the cylinder will cause liquid collecting under gravity in the cylinder to be moved axially along the cylinder towards one end. The liquid collected at the end of the cylinder may be removed by providing a suction duct (not shown). The height of the helical fence 28 is less than that of the sockets 20, so that liquids within the cylinder 16 are guided to the end of the cylinder and do not drain out from empty sockets 20.

As an alternative to the use of a helical fence to collect and distribute liquids and nutrients to the roots, suction at one point in the cylinder and supply of fluids at remote points in the cylinder may establish a flow regime within the cylinder to distribute water, gases and nutrients to the plant roots, even in zero-gravity conditions. In order to control root development, the central region of the cylinders may be selectively illuminated, as light will inhibit root growth. When it is desired to arrest root development, then lights within the cylinders may be illuminated. The central region may also be temperature controlled, by heating or cooling, to achieve rhizosphere conditions different from the ambient temperature and/or humidity.

In use, the apparatus may be installed within a glasshouse in order to provide for the propagation of a large number of seedlings and/or cuttings in a relatively small area. The provision of a light source extending along the axis of rotation of the two end frames 11, coupled with the rotary motion of the end frames 11 and the rotation of the cylinders 16 will provide an extremely uniform illumination regime for the growing plants, as well as substantially eliminating geotropic effects and thus causing the plants to grow substantially straight stems extending radially from the cylinders 16. In order to ensure balanced levels of illumination to the plants growing from the cylinders 16, the axial spacing of light sources may be adjusted to concentrate the light sources at the end regions of the linear source 17. To avoid the tips of the plants approaching the light source 17 too closely, the radial spacing of the cylinders 16 with respect to the end frames 11 is periodically adjusted as the plants grow taller.

Although not shown in the drawings, it is foreseen that supplementary radiation sources, either natural or similar to the linear light source 17, may be provided, preferably extending between the end frames 11 parallel with the central light source 17. Alternatively, linear light sources parallel to the central light source 17 may be supported on fixed supports attached to the uprights 5 or to the members 3 and 4 forming the base. A particular advantage of the centrally placed light source within the rotating array of plants is the enhanced direct illumination of all leaf surfaces including the undersides of the leaves of the plants, leading to vigorous growth.

As well as providing an increased density of plants per square metre of floor area, the apparatus has several other advantages in operation. It will readily be appreciated that, when the crop requires working, the cylinder 16 housing the plants to be treated can be held at an ergonomically convenient height for an operative to stand upright, or sit and tend the crop with minimal movement. This will allow operations on the crop to be carried out much more quickly than has been the case hitherto, since stooping and bending on the part of the operatives is eliminated.

A further advantage of the radial growth directions of the plants relative to the cylinders 16 is that, as the plants grow taller, they are provided with progressively more growing space in that the circumferential lateral spacing between the plant stems increases as the radius from the surface of the cylinder 16 increases. The effect of reflected infra-red radiation from adjacent plants, which has been shown to have disadvantageous etiolation effects on the growth of high density plant populations, is thereby counteracted.

In a further advantageous embodiment (not shown) the plants or seedlings are housed not in individual plant holders such as the plant holders 21, but are housed in a linear array on strips which can be spirally wound round the respective cylinders 16. Ideally, seedlings are provided on strips which are wound in a single or multiple helix arrangement around each cylinder, so that as the plants increase in size a first and subsequently a second strip may be removed from the cylinder leaving the remaining plants of the crop with a progressively increasing spacing. Clearly, the spacing of the plants along the strips will have to correspond with the spacing of sockets 20 in the cylinders, for ease of application of the strips. The plant locations along the strips may be arranged so that each strip is separable into two or more strips of evenly spaced plants whose spacing is a multiple of the original plant spacing. Advantageously, the strips carry plant supports which can be opened for the rapid removal of plants and the re-use of the support. Ideally, the strips can be wound onto the cylinders using the rotation of the cylinder to draw the strip into engagement with the sockets 20 of the cylinder. Likewise, as each strip is to be removed from a cylinder, it may be simply unwound from one cylinder to be wound onto an adjacent cylinder.

As an alternative to the use of a container of growing medium 24 for each plant, the cuttings or seedlings may simply be held by passing the plant through a slit in a rubber or other waterproof strip, the strip then being wound round the cylinder so that the root of the seedling or the rooted cutting, extends into the interior of the cylinder 16 where it can derive nourishment from a sustained mist of water and nutrient. To provide added stability to the plants, the plant stems may be supported by means of stays or struts extending either from the surface of cylinder 16, or more preferably from the strips in which the plants are held. In the embodiment shown, a stem support for the plant may be formed by extending the radially outer end of the helical spring 22 into a linear upstanding strut, bending the top of the strut through 90° and forming a ring or other configuration to receive the plant stem.

In an alternative construction of the cylinders 16, each cylinder is composed of an outer skin 32, to the inside surface of which is adhered a 15 mm thick layer of dense closed cell foam material 34. To the inner surface of the dense foam material is bonded an inner permeable layer 36 such as foam, mineral wool, glass fibres, etc., extending between the dense foam material 34 and a 150 mm diameter central void 37. The outer skin 32 is approximately 3 mm in thickness, and has an external diameter of approximately 380 mm.

The inner permeable layer 36 preferably consists of helical layers of open cell foams of different densities and different capillary characteristics, extending along the cylinder to register with the spirally arranged openings 38 for receiving plant seedlings. In the preferred embodiment, a layer of dense open cell foam 40 extends in exact registry with the spirally arranged openings 38, each opening extending through the outer skin 32, through the dense 34 foam and into a denser area of the inner foam layer 40. This denser part of the inner foam layer 40 extends spirally between, and envelops, a plurality of openings. Adjacent the denser foam layer is a layer of foam of intermediate density, next to which is a layer of foam of low density 42. This composite construction of the cylinders 16 enables nutrient liquids to be fed to the plant roots through the foam, the spirally wound stratification of the foam in different densities causing liquids to be transported along the cylinder by rotation of the cylinder providing oxygenation of the plant roots.

It is further foreseen that the apparatus may be used for the continuous growth and harvesting of root crops, by forming each cylinder as a number of hinged sectors which can be separated along radial planes to reveal root crops for harvesting, and can subsequently be reclosed so that the plants may continue to develop root or tuber crops. Such an arrangement could have utility in the production of potatoes, and day length can be controlled to increase yield.

The cylinders divided into sectors for the cultivation of root crops are advantageously formed with a substantially rigid outer skin and a foam core, the foam core being sufficiently resiliently deformable, typically comprising foams of different densities and cell sizes, to accommodate growing crops along the joining planes of the cylinder. A preferred number of joining planes for each cylinder is six, with the cylinders either circular or polygonal in shape.

When the device of the present invention is used for the cultivation of plants from cuttings, it is envisaged that cuttings will be first prepared by being taken from a mother plant and being placed in a locating pocket extending substantially transversely across a flat belt. The belt will have pockets at regular intervals, for example 5 inches (127 mm) apart, and in a preferred method, this belt is held in a framework and automatically advanced stepwise as each cutting is inserted into its respective pocket. The belt can then be wound into a flat spiral, and the belt and its cuttings can then be held at the correct environmental conditions for storage and/or callousing of the cuttings.

When the cuttings are at the correct stage of development, the belt holding the cuttings is placed together with a second belt which houses a number of plugs of a growing medium such as peat, rock wool or other natural or artificial substrate, the spacing between each adjacent pair of plugs being equal to the spacing between adjacent pairs of cuttings. The cuttings can then either be pushed out of their pockets and into a respective growing medium plug, or the cuttings may protrude from the pockets so that the protruding ends may enter the growing medium plugs without the cuttings leaving their respective pockets, the two belts being optionally joined together.

The cuttings and their plugs are then retained in appropriate conditions to encourage callus and root development of the plants. This can be done by suspending the cuttings in their belt or belts within an impervious envelope to form a series of parallel rows of plants. After a short time, for example two days to five days for soft-wooded species (longer for harder-wooded plants), the belts may then be wound onto the cylinders of the cultivation device, preferably as a multiple staggered array of three or four belts extending in a spiral round the cylinder. During winding of the belts onto the cylinder, the spacing of the growing medium plugs will correspond to the spacing of openings or grooves in the cylinder so that the plugs may be received into respective openings of the cylinder for liquid nutrition either from the cylinder or via a longitudinal channel formed in one of the belts with individual flow controls for each cutting to deliver liquid in response to the plant's need.

In order to provide for a 'tightening' of the belt on the cylinder, an inflatable sac may extend longitudinally of the belt, and may be inflated with gas or liquid after wrapping the belt about the cylinder to ensure correct tension in the belt.

After a short interval growth of the plants at a high plant density, some of the plants may then be removed from the cylinder by unwinding one or two of the three or four pairs of belts from the cylinder so that each of the plants in the remaining two belts has at least one side adjacent an open space on the cylinder. After a further short growing period, one of the remaining pairs of belts is removed to allow the plants maximum spacing. The preferred interval for the removal of successive belts from the cylinder is 5 days for soft-wooded pant species.

As a further alternative, seeds or plants may be initially germinated or rooted and grown as a 'mat' 44 in a layer of growing medium 24 held between a retaining membrane 46 and a porous substrate. The substrate may then be wound round a cylinder having a perforated or foraminous surface so that water and nutrients may be provided to the substrate from the interior of the cylinder.

In a further alternative, the 'strip' or belt may be tubular in form with the roots of the plants extending into the lumen of the tube. Nutrients for the plant may be fed into an end of the tube, to be transported by the rotation of the cylinder and its spirally wound tube, or may be fed into the tube at intervals along its length via spigots extending through the tube wall.

It is also foreseen that the cylinders 16 may be subjected to vibration, which will affect the growth of the plants by promoting thickening of the leaf tissue and thus improved photosynthetic ability.

To enhance the illumination of the plants, elongated mirrors or reflective strips may be mounted to extend between the end frames at circumferential locations midway between adjacent pairs of cylinders 16. These mirrors may be adjustable in rotation about their longitudinal axes, to reflect radiation emanating from the central light source and passing between respective pairs of cylinders, so that this energy is not lost but is reflected back onto the plants situated on the radially outward sides of the cylinders 16. Planar, convex or concave mirrors are foreseen.

To further reduce loss of light during the hours of darkness, the entire apparatus may be enclosed in a reflective enclosure, the preferred form of the enclosure being that of a cylinder arranged coaxially with the rotating parts of the apparatus. Preferably, the enclosure is formed of a flexible reflective fabric such as PERITHERM (Registered Trade Mark) supported by a frame, the enclosure being advantageously deployed and retracted by motorised means.

I claim:

1. An apparatus for the cultivation of plants comprising, a pair of substantially rigid rotatable end frames (11) mounted for rotation about a common horizontal axis, a number of elongate plant-supporting elements (16) mounted at their respective ends to the respective end frames (11) and arranged with their longitudinal axes generally parallel, the plant-supporting elements being rotatable about their longitudinal axes relative to the end frames, and wherein the plant-supporting elements are provided with radially extending plant receptacles (20) arranged regularly on their surfaces, characterised in that an elongate horizontal linear source (17) of radiation beneficial to plants, emitting radiation substantially uniformly in all radial directions, is positioned along the axis of rotation of the end frames (11) to expose the surfaces of the plant-supporting elements (16) to a uniform amount of incident radiation from all directions relative to the plant stem direction.

2. An apparatus according to claim 1, wherein the plant supporting elements (16) have attached to their surfaces a mat comprising a radially outer retaining layer, and a growing medium layer, and plants are dispersed in the growing medium layer.

3. An apparatus according to claim 1, wherein the plant supporting elements (16) are conical, and have their generatrix adjacent the radiation source aligned parallel thereto.

4. An apparatus according to claim 1, wherein the distance of each plant-supporting element from the radiation source is adjustable.

5. An apparatus according to claim 1, wherein the plant-supporting elements (16) are hollow cylinders and individual plants are receivable in openings (20) in the cylinder wall so that nutrients supplied to the interior of the cylinders are accessible to the plant roots.

6. An apparatus according to claim 5, wherein the plant-supporting elements (16) are formed by an outer impermeable skin and an inner foam core surrounding a central void, the foam core being permeable to liquids, and a plurality of openings being formed in the skin in alignment with radial passages in the foam core.

7. An apparatus according to claim 6, wherein the foam core comprises areas of differing permeability and rigidity, and wherein the radial-passages are formed in areas of relatively low permeability and high rigidity.

8. An apparatus according to claim 6, wherein the foam core includes a radially extending helical stratum of foam material of low permeability.

9. An apparatus according to claim 1, wherein each plant-supporting element (16) is independently driven in rotation relative to the end frames.

* * * * *